United States Patent [19]

Bresolin

[11] Patent Number: 5,522,987

[45] Date of Patent: Jun. 4, 1996

[54] EXTERNAL FILTER DEVICE PARTICULARLY FOR AQUARIUMS

[76] Inventor: Valerio Bresolin, Via Cornon 9, 36020 -Pove Del Grappa (Vicenza), Italy

[21] Appl. No.: 310,479

[22] Filed: Sep. 22, 1994

[30] Foreign Application Priority Data

Sep. 28, 1993 [IT] Italy ................... VI93U0077

[51] Int. Cl.$^6$ ................................. A01K 63/04
[52] U.S. Cl. ................. 210/169; 210/416.2; 210/259; 210/260
[58] Field of Search .................. 210/169, 416.2; 119/226, 259, 260, 261, 262, 263

[56] References Cited

U.S. PATENT DOCUMENTS

| 3,511,376 | 5/1970 | Sesholtz | 210/169 |
|---|---|---|---|
| 3,513,978 | 5/1970 | Newsteder | 210/169 |
| 3,525,435 | 8/1970 | Conner, Jr. | 210/169 |
| 3,635,344 | 1/1972 | Lovitz | 210/169 |
| 4,036,756 | 7/1977 | Dockery | 210/169 |
| 4,093,547 | 6/1978 | Sherman et al. | 210/169 |
| 4,483,769 | 11/1984 | Sherman | 210/169 |
| 4,512,885 | 4/1985 | Willinger | 210/169 |
| 4,602,996 | 7/1986 | Willinger | 210/169 |
| 4,622,148 | 11/1986 | Willinger | 210/169 |
| 4,761,227 | 8/1988 | Willinger et al. | 210/169 |
| 4,783,258 | 11/1988 | Willinger et al. | 210/169 |
| 4,820,410 | 4/1989 | Cavalcante | 119/259 |
| 4,842,727 | 6/1989 | Willinger et al. | 210/169 |
| 4,997,559 | 3/1991 | Ellis et al. | 210/169 |
| 5,002,660 | 3/1991 | Sherman et al. | 210/169 |
| 5,098,585 | 3/1992 | Woltman et al. | 210/778 |
| 5,176,824 | 1/1993 | Willinger et al. | 210/169 |
| 5,228,986 | 7/1993 | Ellis et al. | 210/169 |
| 5,246,571 | 9/1993 | Woltmann | 210/169 |
| 5,266,190 | 11/1993 | Tominaga | 210/169 |
| 5,290,436 | 3/1994 | Danner | 210/169 |

*Primary Examiner*—Cynthia L. Nessler
*Attorney, Agent, or Firm*—R. Neil Sudol; Henry D. Coleman

[57] ABSTRACT

An external filter device particularly for tanks and aquariums which includes a container that can be anchored outside the tank and is internally provided with an intake chamber (13) and with a discharge chamber (13) separated by a partition; the discharge chamber is divided into two regions by a filtration part. The device has a pumping means for the water to be filtered; this means is suitable to avoid outward seepage and/or loss of water.

7 Claims, 2 Drawing Sheets

5,522,987

EXTERNAL FILTER DEVICE PARTICULARLY FOR AQUARIUMS

BACKGROUND OF THE INVENTION

1. Field of the Invention

The present invention relates to an external filter device particularly for tanks and aquariums.

2. Description of the Prior Art

Conventional external filters include a container that is internally provided with an intake chamber and with a discharge chamber that are separated by a filtration part and are connected to the outside by means of respective openings or ducts.

In a known device, the container is open at the top and one of its upper edges is partially depressed and folded outward so as to form a part for anchoring to the upper rim of the tank or aquarium, and also forming a discharge opening.

The device has a pump for circulating the water of the aquarium through the container. The pump is generally a centrifugal pump which is partially immersed in the container and is driven by an electric motor which is located outside the container.

The bladed impeller of the pump is accommodated in the intake chamber of the container, and its axis passes through the wall of the container with the interposition of suitable gaskets.

The intake chamber is connected to the aquarium by a suction duct which is provided with appropriate elbows and connectors; its free end is partially immersed in the water.

A drawback of conventional external filters is the leakage of water due to a poor seal between the connectors and the gaskets fitted on the impeller axis.

Another drawback is the need to partially fill the container to allow priming in the pump and the difficulty of this operation due to air bubbles that form in the suction duct. Another drawback is the relative complexity and difficulty of the operations for installing the device, and particularly for assembling the various suction connectors and tubes and for their vertical adjustment. These operations require a certain dexterity and do not always yield satisfactory results.

Another drawback of prior art filters is their large number of component parts and their complex assembly with consequent high manufacturing cost.

The aim of the present invention is to eliminate the drawbacks described above by providing an effective external filter device for aquariums which has a particularly simple structure and has no sealing problems.

An object of the invention is to provide a filter device which substantially has no pipes and connectors to be assembled, so as to avoid complicated and onerous operations for watertight installation.

Another object of the invention is to provide a filter device having low manufacturing and maintenance costs.

SUMMARY OF THE INVENTION

This aim, these objects and others are achieved by an external filter device, particularly for tanks and aquariums, comprising a container that can be anchored outside the tank at one of its upper edges and is internally provided with an intake chamber and with a discharge chamber, the discharge chamber being divided into two regions by a substantially flat and vertical filtration part, characterized in that a submersible electric pump is removably mounted proximate to the upper edge of a lateral part, said pump having a suction inlet which is connected to the inside of the aquarium and a discharge duct which has a discharge outlet that can be orientated towards the intake chamber of the container.

The container has a side wall with an upper rim that is partially depressed and folded outward so as to form a channel for discharge towards the aquarium and a part for anchoring the device to the aquarium by placing it astride one of its upper rims.

This arrangement allows to eliminate the water leakages of devices of the prior art; the lack of pipes, connectors and sealing rings considerably simplifies manufacture, assembly, installation, and use, considerably reducing manufacturing and maintenance costs.

BRIEF DESCRIPTION OF THE DRAWINGS

Further characteristics and advantages will become apparent from the detailed description of a preferred but not exclusive embodiment of the filter device according to the invention, given by way of a non-limiting example with the aid of the accompanying drawings, wherein.

DESCRIPTION OF A PREFERRED EMBODIMENT OF THE INVENTION

Figure 1:
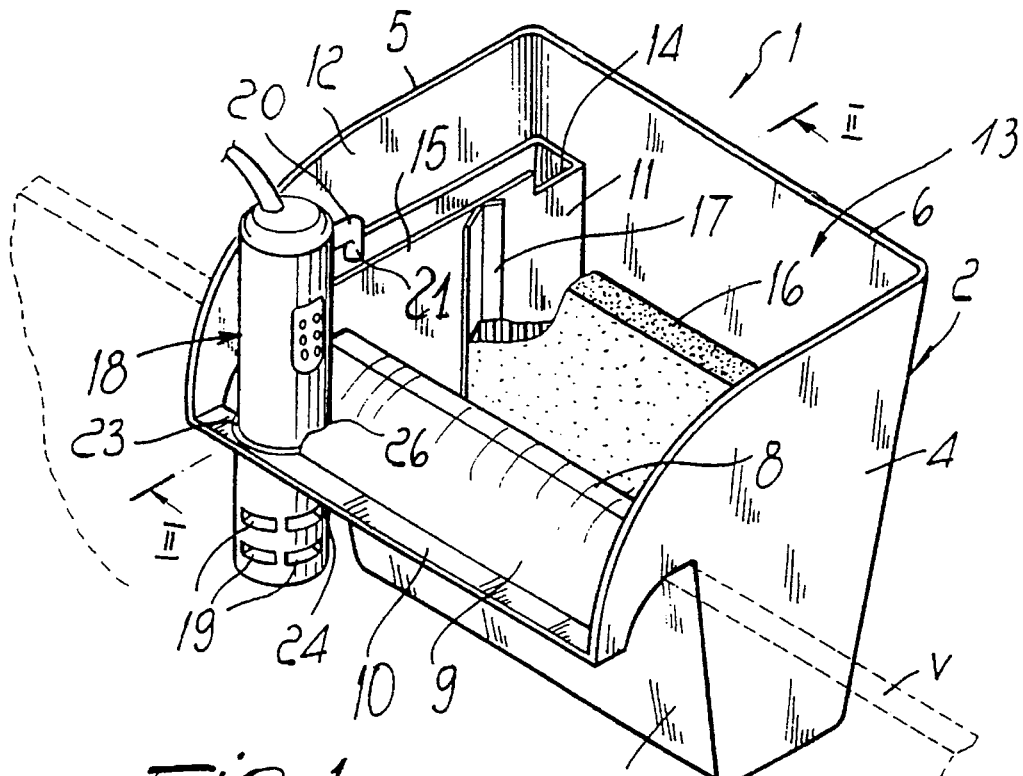
FIG. 1 is a general perspective view of an external filter device according to the invention.
Figure 2:
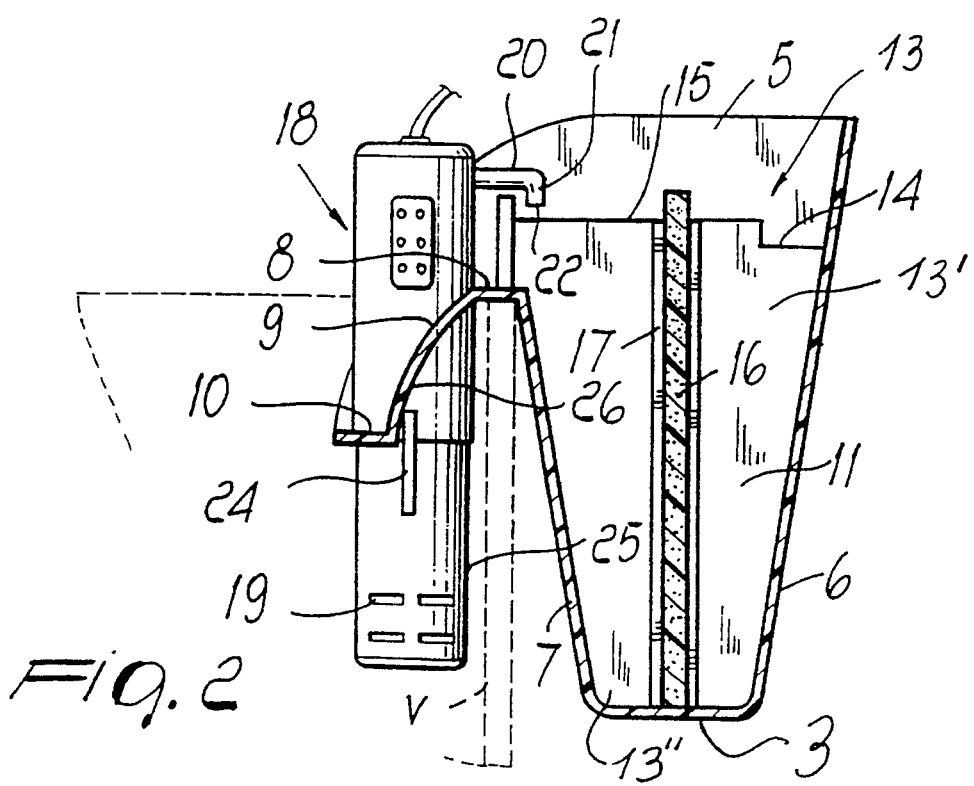
FIG. 2 is a sectional view of the filter device of Figure 1, taken along line II—II of FIG. 1.
Figure 3:
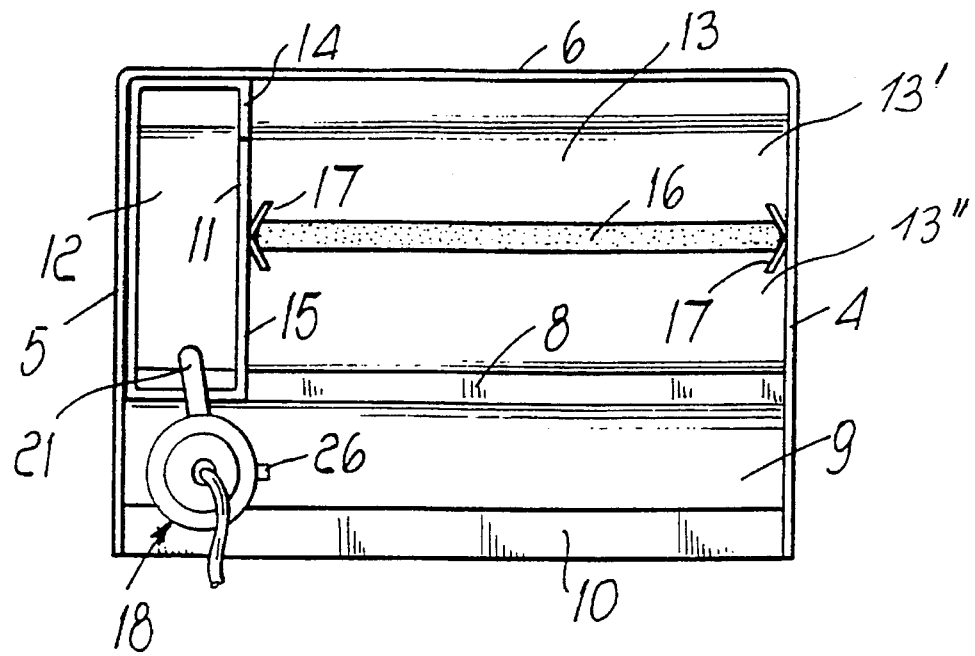
FIG. 3 is a top view of the filter device of FIG. 1.
Figure 4:
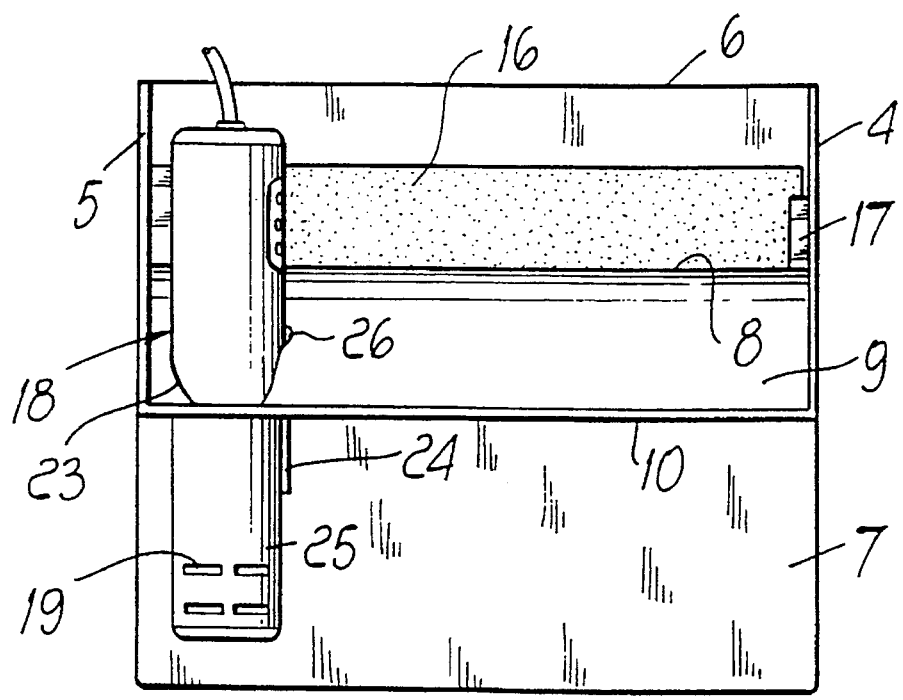
FIG. 4 is a front view of the filter device of FIG. 1.

An external filter device for aquariums according to the invention, generally designated by the reference numeral 1, includes a substantially prism-shaped container 2 which is slightly flared upwards to increase its capacity and can be anchored to the outside of a tank or aquarium, schematically shown by the dashed line V.

The container includes a base wall 3 and four side walls 4, 5, 6, and 7. The upper rim 8 of the side wall 7 is depressed and folded towards the outside of the container so as to form a curved water discharge surface 9 with a stiffening edge 10. This edge also defines a part for anchoring the filter to the aquarium V by placing it astride the aquarium upper rim.

The internal chamber of the container 2 is divided by a substantially vertical partition 11 into an intake chamber 12 and a discharge chamber 13 which is larger than the first chamber 12. The upper edge of the partition 11 has, at one end, a recess 14 which forms an overflow edge between the two chambers 12 and 13 and has, at the opposite end, a deflector 15 between the chambers. The function of this deflector will be explained hereafter.

The discharge chamber 13 contains an interchangeable filtration part or cartridge 16 which is substantially flat and is inserted vertically in adapted guides 17 formed along the side wall 4 of the container 2 and on the surface of the partition 11, on the side that lies inside the discharge chamber 13. Filtration part or cartridge 16 divides discharge chamber 13 into an upstream compartment 13' in fluid communication with intake chamber 12 and a downstream compartment 13" in fluid communication with an aquarium or tank.

According to the invention, there is a submersible electric micropump 18 of the type that extends longitudinally, disclosed in the European Patent Application No. 94109686.9, which is detachably mounted along the upper edge 8 of the side wall 7 of the container 2 with a suction inlet 19 immersed in the tank V. The pump 18 has a substantially horizontal discharge duct 20 whose outer end 21 is folded downward so as to arrange itself astride the upper edge of the wall 7 with a discharge outlet 22 that is directed towards the inside of the container 2, particularly towards the intake chamber 12.

Conveniently, the micropump 18 can be inserted in a substantially cylindrical seat 23 formed on the folded edge 8 of the wall 7 which has a diameter that is slightly larger than the external diameter of the micropump 18, so as to allow a certain rotation of the pump about its own longitudinal axis.

By rotating the body of the pump 18 it is possible to orientate the discharge outlet 22 in a space that lies between the intake chamber 12 and the discharge chamber 13 downstream of the filtration part 16 at the deflector 15. In this manner, by orientating the discharge flow against the deflector blade 15 of the partition 11 the user can adjust the flow rate of the water to be filtered, bypassing the remaining unfiltered part towards the aquarium.

The micropump 18 can be inserted in the seat 3 on the container 2 in safe conditions even when the micro-pump is active, because there is a longitudinal protrusion 24 on the casing 25 of the micro-pump 18 that can be inserted in a complementarily shaped recess 26 formed on the hole 23 for inserting the micro-pump 18 in a preset position, so as to orientate the discharge outlet 22 of the micro-pump 18 towards the inside of the container 2.

Furthermore, the flow rate of the micropump can be changed with an internal adjustment means, constituted for example by slots formed on the upper body of the pump which can be aligned with complementary fixed slots on the lower body thereof.

The container 2 is preferably made of injection-molded plastic.

The external filter device according to the invention, if used correctly, ensures that there is no outward seepage of water. Furthermore, it can be easily installed by anybody without forming any connections or couplings.

The device, according to the invention, requires minimal maintenance, which substantially consists in periodically replacing the filtration part; this replacement can in any case be performed easily.

Although the invention has been described with reference to the embodiment illustrated in the drawings, it is understood that the filter device is susceptible to numerous modifications and variations, all of which are within the scope of the inventive concept expressed by the accompanying claims.

I claim:

1. An external filter device for aquariums and ornamental tanks, comprising:

a container mountable outside a tank along an upper edge thereof;

a partition wall disposed inside said container to define an intake chamber for receiving contaminated water from the tank and a discharge chamber for feeding water back into the tank;

a substantially planar filtration member disposed in said discharge chamber to divide said discharge chamber into a first compartment in fluid communication with said intake chamber and a second compartment in fluid communication with the tank; and pump means for pumping water from the tank into said container, said pump means including a micropump having a substantially elongate cylindrical housing removably mounted along a substantially vertical axis to said container, said cylindrical housing having at least one suction opening formed in a lower end and an outlet duct rigidly attached to an upper end, said outlet duct having a downwardly directed discharge outlet, said pump means further including adjusting means for adjusting a flow rate of contaminated water to be filtered, said adjusting means including a seat formed on said container proximately to said partition wall and to said second compartment of said discharge chamber for rotatably receiving said housing so that, upon a rotation of said housing about said vertical axis, said discharge outlet is selectively positionable between a first angular position substantially overlying said intake chamber and a second angular position substantially overlying said second compartment of said discharge chamber and by-passing said filtration member.

2. The device defined in claim 1 wherein said seat is substantially cylindrical and has a slightly larger diameter than an external diameter of said housing.

3. The device defined in claim 2, further comprising means for positioning said micropump in either of said first angular position and said second angular position to avoid an erroneous orientation of said discharge outlet wherein contaminated water is discharged outside of said container.

4. The device defined in claim 3 wherein said means for positioning comprises a substantially radial protrusion on said housing and at least one complementarily shaped recess at said seat for securing said housing against rotation about said vertical axis.

5. The device defined in claim 1 wherein an upper edge of said partition wall has a deflector rim for diverting water emerging from said discharge outlet towards said second compartment when said discharge outlet overlies said partition wall.

6. The device defined in claim 1 wherein said container has a bottom wall, a front wall, a back wall and side walls, an upper edge of said front wall being outwardly and downwardly shaped to form a spillway for discharging water into the tank from said second compartment, also comprising an anchoring member.

7. The device defined in claim 1 wherein said pump means includes valve means located internally of said housing for adjusting the flow rate of the pumped water.

\* \* \* \* \*